(12) United States Patent
Gerritse et al.

(10) Patent No.: US 7,833,667 B2
(45) Date of Patent: Nov. 16, 2010

(54) BIOFUEL CELL

(75) Inventors: Jan Gerritse, Apeldoorn (NL); Machiel Saakes, Apeldoorn (NL); Alfons Johannes Maria Stams, Wageningen (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 1120 days.

(21) Appl. No.: 10/519,548

(22) PCT Filed: Jun. 30, 2003

(86) PCT No.: PCT/NL03/00482

§ 371 (c)(1), (2), (4) Date: Dec. 28, 2004

(87) PCT Pub. No.: WO2004/004036

PCT Pub. Date: Jan. 8, 2004

(65) Prior Publication Data

US 2005/0255345 A1 Nov. 17, 2005

(30) Foreign Application Priority Data

Jun. 28, 2002 (NL) .................................... 1020965

(51) Int. Cl.
*H01M 8/16* (2006.01)
(52) U.S. Cl. ........................ 429/401; 429/457; 429/502
(58) Field of Classification Search ...................... 429/2
See application file for complete search history.

(56) References Cited

U.S. PATENT DOCUMENTS 4,126,934 A * 11/1978 Richter et al. .............. 29/623.1
4,578,323 A * 3/1986 Hertl et al. ..................... 429/15
4,581,105 A * 4/1986 Chao et al. .................. 205/412

(Continued)

FOREIGN PATENT DOCUMENTS

DE 43 45 148 12/1994

(Continued)

OTHER PUBLICATIONS

Habermann et al., Biological Fuel Cells with Sulphide Storage Capacity, Dec. 20, 1990, Applied Microbiology and Biotechnology, pp. 128-133.*

(Continued)

*Primary Examiner*—Dah-Wei D Yuan
*Assistant Examiner*—Adam A Arciero
(74) *Attorney, Agent, or Firm*—Young & Thompson

(57) ABSTRACT

A method and device for processing organic waste in an environmentally friendly manner. The waste flow is processed in a bipolar biofuel cell. The waste is introduced into a space having a pair of electrodes, which includes at least one anode and at least one cathode, while in a bipolar cell the anode and cathode are separated spatially and/or by a porous, electronically non-conductive, non-ion-selective wall, while an oxidizer is introduced in the space around the cathode, and where a potential difference is formed across the pair of electrodes such that at the anode $CO_2$ is produced and electricity is produced. The method can be carried out with waste flows including animal manure, waste water, waste water purification sludge, kitchen and garden waste (KGW), roadside grass, residual flows from industrial processes (such as molasses, whey, draff) and/or dredgings.

15 Claims, 2 Drawing Sheets

U.S. PATENT DOCUMENTS 4,883,724 A * 11/1989 Yamamoto .................... 429/23
6,183,901 B1 * 2/2001 Ying et al. ................... 429/129

FOREIGN PATENT DOCUMENTS

| EP | 0 827 229 | 3/1998 |
| EP | 0827229 A2 * | 4/1998 |
| GB | 981 803 | 1/1965 |
| WO | WO 01 04061 | 1/2001 |
| WO | WO 01/04061 A1 * | 1/2001 |

OTHER PUBLICATIONS

Habermann W et al: "Biological Fuel Cells With Sulphide Storage Capacity" Applied Microbiology and Biotechnology, Springer Verlag, Berlin, DE, vol. 35, No. 1, 1991, pp. 128-133, XP000862908 ISSN: 0175-7598 the whole document.

* cited by examiner

BIOFUEL CELL

The invention relates to a method for processing organic waste in an environmentally friendly manner, and to a device suitable thereto.

When processing organic waste such as manure, as a rule, use is made of fermentation. Organic material is then decomposed by micro-organisms under aerobic and anaerobic conditions. Generally, fermentation takes place under anaerobic conditions and yields a methane-rich product flow. It is known that methane is a greenhouse gas, i.e. its presence in the atmosphere may give rise to the so-called greenhouse effect. The so-called global warming potential (GWP) of methane is 21, i.e. the global warming potential is 21 times higher than that of $CO_2$ (see, for instance, US Environmental Protection Agency, EPA-430-R-01-007, "Non-$CO_2$ Greenhouse Gas Emissions from Developed Countries: 1990-2010", December 2001). For this reason, the emission of methane should be limited as much as possible.

A solution to this problem can be burning the produced methane, but in practice this does not always happen, and is certainly not always possible, because it requires special provisions for capturing the produced methane before this ends up in the atmosphere.

Capturing and burning the produced methane could be made economically more attractive by using the produced heat in a profitable manner, for instance for the generation of energy, in particular in the form of electricity, but the efficiency for that purpose is basically limited. Furthermore, this requires considerable investments.

An object of the present invention therefore is to provide a method and device for processing waste flows comprising organic material in a manner such that the emission of methane is limited and that, also, useful energy in the form of electricity is produced.

According to the invention, this object is achieved by processing the waste flow in a biological fuel cell, designed, preferably, in a bipolar configuration. Therefore, the present invention relates to a method for processing organic waste in which the waste is introduced into a space in which a pair of electrodes is present, separated by a non-electrically conductive separator, which pair of electrodes comprise at least one anode and one cathode, while an oxidizer is introduced into the space around the cathode and a potential difference is formed across said pair of electrodes such that $CO_2$ is produced at the anode and that electricity is produced.

Figure 1:
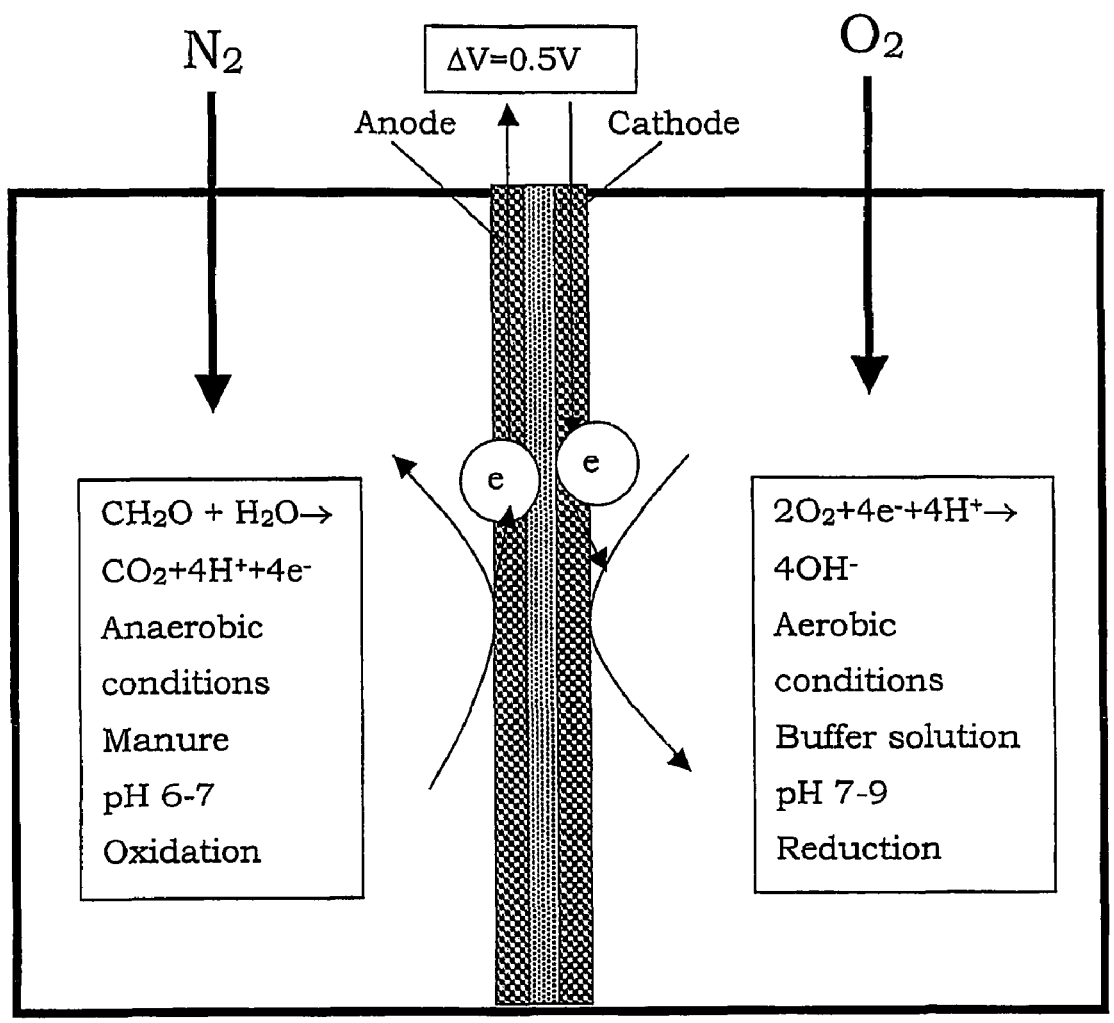
FIG. 1 schematically shows a cell according to the invention.

Preferably, the biofuel cell according to the invention is deployed in a so-called bipolar configuration. According to this configuration, the cathode and anode are electronically connected by means of a bipolar plate or film, which plate or film does not allow passage of ions and which is also fluid-tight. By adding a bipolar plate, the total voltage is increased each time by one time the cell voltage of each cell in which a bipolar plate is used.

Therefore, in comparison to unipolar systems, the bipolar configuration gives a higher voltage, a lower internal resistance and a more homogenous current density distribution across the electrodes so that, eventually, a system of a higher power is obtained.

The bipolar plate can, for instance, be manufactured from carbon or graphite, from a metallic conductor (in particular corrosion resistant steel), from a conductive plastic, or from plastic filled with conductive material, such as graphite or carbon. Conductive toxic metals such as lead are less suitable to the present invention because this could lead to contamination with the metal.

According to the invention, use is made of the capacity of certain micro-organisms to impart electric energy to electrodes and hence generate electricity. This phenomenon is described inter alia by Benetto (Biotechnology Education, 1 (1990) 163-168). So far, the underlying mechanism has not been clarified yet. Without wishing to be bound to theory, it is presumed that in the biological fuel cell, competition arises between micro-organisms capable of giving up their electrons to the anode, whether or not via an intermediary compound, at the expense of micro-organisms not capable thereof. The micro-organisms capable of using the electrode as electron acceptor then selectively grow in number and activity.

The reaction of the organic waste (represented as hydrocarbon compound [$CH_2O$]) in a biological fuel cell according to the invention can roughly be described as follows, in case oxygen is used as oxidizer (takes up electrons and is itself reduced):

| Anode: | [$CH_2O$] + $H_2O$ | $\rightarrow CO_2 + 4H^+ + 4e^-$ | (oxidation) |
|---|---|---|---|
| Cathode: | $O_2 + 2H_2O + 4e^-$ | $\rightarrow 4OH^-$ | (reduction) |
| Nett: | [$CH_2O$] + $O_2$ | $CO_2 + H_2O$ | |

Depending on the specific process conditions and the type of electrode material, at the cathode, partial reduction of $O_2$ to $H_2O_2$ or complete reduction to $OH^-$ or $H_2O$ can occur. It is of importance that according to the invention, organic waste is converted to $CO_2$ and $H_2O$ while electricity is produced. In this manner, the production of methane is prevented and the emission of the greenhouse gas methane is limited, which yields an important environmental advantage.

Furthermore, the efficiency with which according to the invention electricity can be generated (by converting organic waste directly into electricity) is considerably greater than when the organic waste is first converted to methane and then the formed methane is burned for generating electricity.

The method according to the invention can be carried out with various sorts of organic waste. Particularly suitable are waste flows which contain animal manure, waste water, waste water purification sludge, KGW (kitchen and garden waste), roadside grass, residual flows from industrial processes (for instance molasses, whey, draft) and/or dredgings, because, particularly with conventional fermentation, these waste flows produce methane. The invention is suitable for generating energy not only from waste flows, but also from energy crops such as sugar beets, sugarcane and wood.

According to the invention, a considerable part of the organic components in the waste can be converted to $CO_2$ and water. It is effective to convert approximately 30-50% of the organic material. The residual product contains a favorable ratio of mineral nutrients (among which C, N, P and K) and can for instance be used for fertilizing farmland.

The cell in which the method according to the invention is carried out can conceivably be built up from two (or more) anaerobic and aerobic compartments. The compartments can be formed by a partition wall in the cell. However, according to the present method and design, the use of a partition wall is not strictly necessary (see below).

In the compartment around the anode, substantially anaerobic conditions are maintained. This can be achieved by closing this compartment off from the ambient air and optionally by passing an inert gas, such as nitrogen, therethrough. However, in practice is has appeared that in most cases it is not necessary to make provisions in order to maintain the anaerobic conditions. When, for instance, the surface of the organic waste is in contact with the ambient air, very locally, at the surface, aerobic conversion will occur, whereby all oxygen from the air is rapidly used. The zone in which aerobic conversion occurs with the aid of oxygen from the ambient air appears to be limited to a very thin layer which is, as a rule, only some millimetres thick. Beneath it, all oxygen has been used up and the conditions are anaerobic. Even when the contents of an anaerobic compartment not closed off from the ambient air are stirred, in order to improve the mass transfer, in most cases, the supply of oxygen from the ambient air in most cases appears not to be a bar to the formation of anaerobic conditions, provided that stirring is not carried out too firmly (for instance at a stirring speed corresponding to a speed of the tip of the stirrer of approximately 1 m/s or less).

In most practical cases, the waste in the anaerobic compartment is present in the form of an aqueous suspension or solution. In order to improve the ionic conductivity, if desired, salts, for instance a buffer, can be added.

In the compartment around the cathode, an oxidizer is to be introduced. This oxidizer serves as eventual electron-"sink": From a practical point of view, oxygen (for instance from the air and/or dissolved in water) is preferred as oxidizer. Other oxidizers are possible as well, such as iron(III)cyanide. As, in a continuous production, the supply of the oxidizer needs to be continuous, under most circumstances, oxygen from the air is the most advantageous from economic considerations. In this compartment too, in most practical cases, water is present. However, it is also possible to extract oxygen directly from the air. However, in this case, a special membrane is required, a so-called membrane electrode assembly (MEA) in which, for instance, a carbon or graphite felt has been provided with a coating with, for instance Nafion™ and a catalyst for the catalytic conversion of oxygen gas to water. MEAs are used inter alia in polymer electrolyte fuel cells in which hydrogen gas and oxygen gas are converted to water while electricity is produced.

The partition wall which is used, according to the invention, for dividing the cell in at least one anaerobic and at least one aerobic compartment (in this case, the term "aerobic" need not necessarily refer to the presence of oxygen as oxidizer since also other oxidizers can be used), can be manufactured from any material suitable to this end. Such materials are known per se in the field of electrochemistry. In known biological fuel cells, ion-selective (for instance cation exchanging) membranes are used for separating the anode and cathode compartments from each other (see for instance WO-A-01/04061 and EP-A-0 827 229). Examples include Nafion™. However, the price of such ion-selective membranes is high to such an extent (approximately EURO 1000-2000 per m$^2$) that commercial use of biological fuel cells according to this embodiment is not profitable. A practical objection is that the NAFION™ membrane will rapidly contaminate due to the presence of biomass. Further, important practical drawbacks have been found for alternatives such as diaphragms of sintered porcelain with a pore size in the order of 0.5 micron, or asbestos, as described in GB-A-0 981 803. In addition to such small pores becoming rapidly clogged under practical conditions according to the invention, such ion-selective membranes and diaphragms are also less suitable for use in the present invention because they prevent exchange of components between the compartments as will be elucidated hereinbelow. Surprisingly, it has been found that it is sufficient to use a porous, electronically non-conductive, non-ion-selective partition wall, such as a fiber mat (woven or non-woven, preferably non-woven) while the fibers are manufactured from, for instance, glass or plastic, such as PVC or polyurethane (PUR)-foam. An additional advantage of, particularly, partition walls from plastic (especially foamed plastic such as PUR) is that they contribute to the mechanical strength of the fuel cell so that a firm, robust construction of the bipolar biofuel cell can be obtained. The firmness of the cell according to the invention can be further enhanced by designing the partition wall, in particular the partition wall from foamed plastics (organic polymers), to be compartmented. In this manner, small channels are formed, bounded at least one side by the cathode or anode and bounded at one or more other sides by the material of the partition wall. Thus, between each set of cathode, bipolar plate and anode, the compartmented partition wall material is present. The channels thus formed can, if desired, be flowed-through in reverse current, cross current or a co-current. The walls of the partition wall material which are at right angles to the electrodes and the bipolar plate serve as reinforcement so that the plates can be pressed together firmly, so that, on the one hand, a good contact is obtained between all parts and, on the other hand, a robust construction is obtained.

The partition wall is to be designed such that electronic short-circuit in the cell is prevented. In practice, this means that the partition wall has a thickness of, preferably, from 0.1 mm to a few centimetres, for instance from 0.2 mm to 1 cm. The mesh width or pore size can be some tens of micrometers to tenths of milllimeters. The mesh width or pore size has to be large enough not to clog, which means, in practice, that the pores or meshes are to have a diameter larger than 5 µm. On the other hand, the pores or meshes should, preferably, not be too large, because this may lead to diffusion of components between the compartments, for instance of the oxidizer (such as oxygen) to the anaerobic compartment, or diffusion of organic substances and hydrogen to the aerobic compartment. Excessive diffusion would lead to an inefficient system. However, on the other hand, some diffusion is actually desired, because, preferably, H$^+$ and OH$^-$ must be able to diffuse through the wall, so that the pH is levelled-out as is described hereinbelow. It has been found that these requirements, conflicting as they are in principle, can be met by selecting an optimal pore size. Preferably, the pore size or mesh width according to the invention is more than 0.5 µm to 500 µm, more preferably 5-200 µm, most preferably 30-150 µm. As ion-selective membranes according to the invention are not necessary and even less effective, the replacement by the porous, electronically non-conductive, non-ion-selective partition walls (such as fiberglass mats) means a considerable saving of costs.

According to a different preferred embodiment, the effluent is led from the anaerobic compartment to the aerobic compartment. The waste is first partially decomposed under anaerobic conditions, whereby an effluent containing organic decomposition products is formed. Then, the effluent is led to the space around the cathode, where the organic decomposition products are further decomposed under aerobic conditions. In this manner, a highly effective decomposition of the waste flow is obtained. It is true that this is at the expense of the electricity yield (in the aerobic compartment, a portion of the oxidizer is used up for aerobic fermentation and is hence no longer available as electron sink), but, under certain conditions, this counterbalances the advantage of a further decomposed residual product. This embodiment can also be carried out in a highly suitable manner in already existing installations for anaerobic/aerobic purification (for instance in a UASB-reactor, Upflow Anaerobic Sludge Bed reactor), necessitating only minimum adjustments to the existing equipment.

A device according to the present invention comprises a cell which is divided into at least two compartments by a fiberglass mat (or a different type of porous, electronically non-conductive, non-ion-selective partition wall), while at least two of the compartments are each provided with at least one electrode, which electrodes are arranged such that they can form an electrical circuit, further provided with means for discharging or storing electricity and, if desired, provided with supply means for an oxidizer. Such a device is highly suitable for carrying out the method according to the invention.

By aerating only a portion of the biofuel cell, it is possible to create an anaerobic and an aerobic zone even without utilizing a partition wall. What can be considered here is an embodiment in which an aqueous suspension with the waste is introduced at the bottom of the cell, yielding an anaerobic zone here in which the anode is placed. If aeration of the liquid in the cell takes place at a distance of some decimetres to meters from the anode, a second, aerobic zone can be provided, in which the cathode can be placed. This embodiment is highly suitable for current generation in sequential anaerobic aerobic bioreactors which are used for the purification of waste (water) flows.

Through the use of porous partition walls, it has appeared that transport of dissolved compounds can take place such as $H^+$ and $OH^-$ ions. As a result, the anaerobic compartment is inter alia prevented from acidifying as a result of the production of $CO_2$ and $H^+$, or the aerobic compartment from becoming too basic (see above-mentioned reaction equations): $H^+$ and $OH^-$ can diffuse through the fiberglass mat, so that the pH is levelled out.

For the manufacture of the electrodes, the conventional materials are eligible. It is particularly advantageous if the electrodes are of the so-called three-dimensional type, for instance in the form of foamed structures or felt. Preferably, one or more electrodes are manufactured from carbon, preferably graphite. From a practical point of view, it is advantageous that all electrodes be of the same type. In practice, graphite felt electrodes prove highly suitable. It is true that graphite felt has a higher cost price, but in many cases this counterbalances the improved output that can be obtained therewith. The use of active carbon instead of or in combination with carbon or graphite (felt) electrodes is a good alternative to generate a large biologically active electrode surface at a low cost price.

If desired, the electrode in the aerobic compartment can be provided with a catalyst which accelerates the transfer of electrons to oxygen. The catalyst can be provided in the form of a dispersion of fine particles. Suitable materials for this purpose are precious metals, such as platinum.

Also, advantageously, so-called electron shuttles can be used as catalyst (in addition to or instead of the abovementioned catalysts). Electron shuttles are compounds which catalyse the electron flow. As a result, the current supply is accelerated so that the power of the cell increases. As electron shuttles, for instance one or more humic acids can be used and/or compounds such as anthraquinone disulfonic acids (AQDS), such as anthraquinone-2,6-disulfonate. These compounds can, for instance, be coated on the electrode surface.

The voltage that can be built up in the conventional biological fuel cells (such as, for instance, described in WO-A-01/04061 and EP-A-0 827 229) with one pair of electrodes is small, and limited to, at most, approximately 0.8 volt. This means that for building up a usable voltage level, several biofuel cells have to be connected in series. By placing the cells according to the invention in a so-called bipolar configuration, this drawback is avoided. In a bipolar configuration, an electronically conductive layer is present between the anode and the cathode of two successive cells. Advantages of the bipolar configuration of the biofuel cell are:

i) building up a higher voltage by stacking the cells;
 ii) realizing a much more homogeneous current density over the entire anode and cathode surface;
 iii) making the bipolar cells firm and robust;
 iv) optimising the supply of biofuel and $O_2$ to the anode and the cathode, respectively,
 v) improving the exchange of $H^+$ and $OH^-$ ions between the anaerobic and aerobic compartment;
 vi) drastically reducing the internal resistance so that a higher specific power can be achieved.

With particular advantage, the biological fuel cell in which the method according to the invention is carried out is connected to a battery. In this manner, the produced electricity can be stored (temporarily) and peak loads become possible which are not possible straightaway with the here proposed biofuel cell.

The method according to the invention can be carried out at ambient temperature. It is advantageous to carry out the invention at increased temperature (preferably over 30° C.). This can be achieved by insulating the device in which the method is carried out. Thermophilic cultures will then gain the upper hand. As a rule, at higher temperatures, the (electro- and bio-) chemical processes proceed faster and hence a higher power is obtained. In principle, it is possible to select micro-organisms which are active up to 100° C. With special preference, work is done in the range of 40-60° C.

Surprisingly, it has also been found that the addition of iron ions to the aerobic compartment can considerably accelerate the electron transfer from the cathode to the oxidizer. Without wishing to be bound to theory, it is supposed that this is the result of the presence of Fe(II) oxidizing micro-organisms, such as *Thiobacillus, Gallionella* and *Leptothrix*. These micro-organism are capable of oxidizing $Fe^{2+}$ to $Fe^{3+}$. $Fe^{3+}$ in solution is then reduced at the cathode to $Fe^{2+}$. This reaction proceeds much more rapidly than the reduction of oxygen as the reduction of oxygen is kinetically hindered. Such micro-organisms further need $CO_2$ and mineral nutrients (N, P, S, et cetera) for growth. However, if the partition wall is designed in the form of a fiberglass mat or a different porous partition wall, as described hereinabove, it has appeared that $CO_2$ is formed to a sufficient extent in the anaerobic compartment and thereupon diffuses through the partition wall to a sufficient extent, in order to meet this $CO_2$-requirement. Iron ions can for instance be provided in the aerobic compartment through the addition of rust.

Preferably, the device according to the invention further comprises supply means for an oxidizer, preferably in the form of an air pump. With it, an oxidizer, preferably air, can be pumped into the aerobic portion.

The invention can also be designed in the form of a kit. This comprises a pair of electrodes comprising at least two three-dimensional electrodes, preferably graphite felt electrodes, and a porous, electronically non-conductive non-ion-selective partition wall, preferably a fiberglass mat. With this kit, in an existing storage space, for instance a manure hole or tank, the advantages of the invention can be obtained in a simple manner. The partition wall is to be arranged in the space such that this is compartmented. Then, in each of the compartments, at least one electrode is placed. By introducing the oxidizer in one of the compartments, for instance by aeration with the aid of conventional techniques, as with the aid of an air pump, the above-described biological activity will develop and electricity can be produced.

FIG. 1 schematically shows a biofuel cell according to the invention with anaerobic and aerobic cell halves, while electrodes (anode and cathode) consist of graphite felt and the separator (center) consists of fiberglass mat (or a different type of porous, electronically non-conductive, non-ion-selective partition wall). Transport of charge takes place by means of transport of $H^+$ from the anaerobic to the aerobic compartment and $OH^-$ from the aerobic to the anaerobic compartment through the partition wall, serving as separator. In this Figure, the anode is located in the anaerobic part of the cell and the cathode in the aerobic part of the cell. An important advantage of the invention resides in the cost advantage that can be obtained through the use of the porous, electronically non-conductive, non-ion-selective partition wall instead of expensive ion-selective membranes. An additional advantage of the use of porous, electronically non-conductive, non-ion-selective partition wall is that this, through the addition of iron ions, enables acceleration of the kinetically relatively slow reduction of oxygen.

Figure 2:
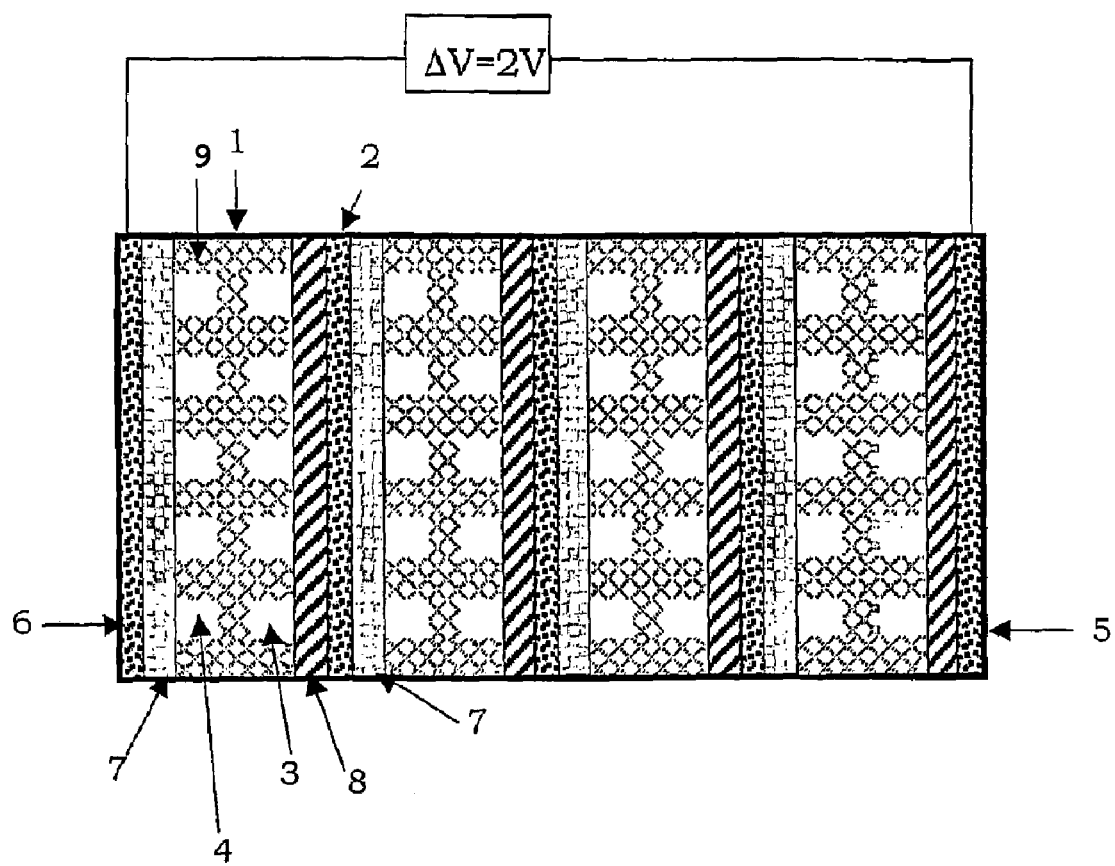
FIG. 2 schematically shows a top plan view of a cell according to the invention.

FIG. 2 schematically shows a top plan view of a bipolar biofuel cell according to the invention. In this Figure, parts having the same function are hatched in the same manner. Several anodes (8) and cathodes (7) are interconnected by means of an electrically conductive bipolar plate (2). At the extremities of the cell, positive end plates (6) and negative end plates (5) are located, across which the total voltage (for instance approximately 2 volt) and current can be drawn. The anaerobic compartments (3) and aerobic compartments (4) are separated by means of porous, non-conductive partition walls (1), for instance of reticulated plastic, such as polyurethane PUR) foam. Partitions (9) are present, preferably from the same material as the porous, electronically nonconductive, non-ion-selective partition wall, which partitions, are placed at least substantially transverse to said electrodes. The porous wall material (for instance PUR-foam) contributes to a firm, robust construction of the bipolar biofuel cell. In the porous wall material channels are provided via which the oxidizer (preferably oxygen) and biomass suspension (for instance manure) can be efficiently led to the cathodes and anodes, respectively. If desired, the channels in the PUR-foam can be arranged in a counter current, cross current or a co-current configuration. The voltage of the bipolar biofuel cell can be increased at will by increasing the number of bipolar cells.

Apart from the generation of electricity with the purpose of providing energy (for instance "green current" to households or companies), the invention can also be used as biosensor for determining and quantifying biological activity. The amount of generated current and the voltage are then a measure for the activity of micro-organisms in, for instance, the ground or (waste) water.

The invention will presently be elucidated in and by an example.

EXAMPLE

FIG. 1 schematically shows the test set-up of this example. A laboratory scale biofuel cell was constructed from an anaerobic cell with approximately 100 grams of mixed pig, cow, horse and poultry manure. A limited $N_2$ gas flow effected a slight mixing of the manure and prevented oxygen from entering into the anaerobic cell. However, this proved not to be essential. In the anaerobic cell a non-woven graphite felt electrode had been placed (surface 78 $cm^2$, thickness 2 mm). This electrode was pressed against a fiberglass mat functioning as electric separation between the anaerobic and the aerobic cell. At the other side of the fiberglass mat, an identical graphite felt electrode was located in water. At this electrode, the reduction of oxygen occurred.

After the electrodes had been connected to a multimeter by means of alligator clips and electric wiring, within 2 hours a voltage of 0.34 V built up. In a period of 5 days, this voltage increased to 0.45 V.

Subsequently, the biofuel cell was charged by connecting the anode and cathode with a resistance of 500 Ohm. At a voltage of 0.3 V, a current of 0.2-0.3 mA was observed for the test period of a week. Here, the power provided was approximately 12 $mW/m^2$ electrode surface (in a non-optimized cell).

Upon a loading with 1000 Ohm, a cell voltage of 0.5 V was measured at a current of 0.4 mA. This loading was imposed on the system for 3 months. If the starting point is an estimated dry matter percentage of 10%, and assuming that the organic matter which was converted was present in the graphite felt with a surface of 78 $cm^2$ and thickness of 0.2 cm and a porosity of 95%, then the amount of dry matter, starting from a density of 1 $g/cm^3$ equals 1.56 g. The amount of generated energy equals 0.5 V×0.4×$10^{-3}$ A×90×24 h, that is, equals 0.432 Wh. Starting from the amount of dry matter of 1.56 g, the specific energy equals 277 Wh/kg. As the theoretic specific energy is in the order of 1000 Wh/kg or more for the conversion of the organic matter to $CO_2$, it can be stated that the conversion has proceeded with an efficiency of approximately 30%. Naturally, this efficiency depends on the geometry of the cell and the embodiment. If the conditions of the cell are upscaled, for a biofuel cell of 225 V, in total, 450 pairs of electrodes in series are required. Starting from an upscaled electrode surface of 100 $m^2$, the current equals (100 $m^2$/78× $10^{-4}$ $m^2$)×0.4 mA=5.1 A. The total power then equals 225 V×5.1 A=1148 W. This provides 27.5 kWh daily.

The following substrates have been found to be particularly suitable as fuels for current production in the biofuel cell: manure, potato, yeast extract, molasses, methanol, ethanol, glucose, hydrogen, formate, acetate, propionate and benzoate. At a load via a resistance of 200 Ohm, dosage of molasses led to a measured current of 103 $mA/m^2$ at a voltage of 0.5 Volt, corresponding to a power of approximately 50 $mW/m^2$.

The invention claimed is:

1. A method for the conversion of organic waste, wherein the waste is introduced into a cell in which a pair of electrodes is present, which pair of electrodes comprises at least one anode and at least one cathode, the anode and cathode being separated by a porous, electronically non-conductive, non-ion-selective partition wall, while an oxidizer is introduced into the portion of the cell around the cathode, and wherein a potential difference is formed across said pair of electrodes such that at the anode $CO_2$ is produced and that electricity is produced, and the porous, electronically non-conductive, non-ion-selective partition wall is partitioned so as to form at least one anaerobic compartment and at least one aerobic compartment, wherein the cell is a bipolar fuel cell in which two or more pairs of electrodes are located, each pair of electrodes comprising one anode and one cathode, the anode and cathode of each pair of electrodes being interconnected by an electronically conductive and non-ionic conductive wall, while the porous, electronically non-conductive, non-ion-selective partition wall of a at least two types of compartments provides at least two types of channels, the open space of the first type of channel being in electrically conductive contact with the cathode and the open space of the second type of channel being in electronically conductive contact with the anode.

2. The method according to claim 1, wherein also partitions are present from the same material as the porous, electronically nonconductive, non-ion-selective partition wall, which partitions, are placed transverse to said electrodes.

3. The method according to claim 1, wherein the organic waste comprises animal manure, waste water, waste water purification sludge, kitchen and garden waste (KGW), roadside grass, residual flows from industrial processes (such as molasses, whey, draff) and/or dredgings.

4. The method according to claim 1, wherein said oxidizer is oxygen.

5. The method according to claim 4, wherein the oxygen is introduced in the form of air and/or dissolved in water.

6. The method according to claim 1, wherein said separator is a porous, electronically non-conductive, preferably non-ion-selective partition wall, preferably comprising non-woven plastic fibers or glass fibers.

7. The method according to claim 1, wherein one or more electrodes are three-dimensional electrodes.

8. The method according to claim 1, wherein one or more electrodes comprise carbon.

9. The method according to claim 1, wherein one or more electrodes comprise active carbon.

10. The method according to claim 1, wherein one or more electrodes are provided with a catalyst.

11. The method according to claim 1, wherein one or more electrodes are provided with humic acid and/or anthraquinone-disulfonic acid.

12. The method according to claim 1, wherein the cell is used as biosensor for the determination and quantification of biological activity.

13. The method according to claim 1, which is carried out at a temperature of 30-100° C.

14. The method according to claim 1, wherein Fe-ions are introduced in the space around the cathode.

15. The method according to claim 1, wherein the waste is supplied in the space around the anode where it is partially decomposed under anaerobic conditions, whereby an effluent comprising organic decomposition products is formed, which effluent is then led to the space around the cathode where it is further decomposed under aerobic conditions.

* * * * *